United States Patent
Hosoi et al.

[11] Patent Number: 5,356,245
[45] Date of Patent: Oct. 18, 1994

[54] COOLING AND DUST COLLECTING APPARATUS FOR A MACHINE TOOL

[75] Inventors: Masanori Hosoi, Mibu; Fumio Watanabe, Utsunomiya, both of Japan

[73] Assignee: Fuji Jukogyo Kabushiki Kaisha, Tokyo, Japan

[21] Appl. No.: 159,575

[22] Filed: Dec. 1, 1993

[30] Foreign Application Priority Data

Dec. 14, 1992 [JP] Japan .................. 4-332988

[51] Int. Cl.⁵ .......................................... B23B 47/34
[52] U.S. Cl. ...................................... 408/56; 408/61; 408/67
[58] Field of Search ................. 408/56, 60, 61, 67, 408/95; 409/135, 137

[56] References Cited

U.S. PATENT DOCUMENTS

| | | | |
|---|---|---|---|
| 4,037,982 | 7/1977 | Clement | 408/67 |
| 4,209,069 | 6/1980 | Smith | 408/67 |
| 4,563,115 | 1/1986 | Abe et al. | 408/67 |
| 5,033,917 | 7/1991 | McGlasson et al. | 408/67 |
| 5,087,156 | 2/1992 | Kanaya et al. | 408/61 |

FOREIGN PATENT DOCUMENTS

63-16910  1/1988  Japan .

*Primary Examiner*—Daniel W. Howell
*Attorney, Agent, or Firm*—Beveridge, DeGrandi, Weilacher & Young

[57] ABSTRACT

A cooling and dust collecting apparatus for drilling machine tool is disclosed, which comprises a telescopically expandable/shrinkable cylinder having a base cylinder and a movable cylinder, the base cylinder being disposed on the drilling machine in such a manner that the base cylinder surrounds the drilling machine, the movable cylinder being slidably connected to the base cylinder, the movable cylinder surrounding a cutting tool, a blowing pipe connected to an outlet opening portion defined on the movable cylinder, the blowing pipe being adapted for blowing the cutter with cold air, and a sucking pipe connected to an inlet opening portion defined on the movable cylinder, the sucking pipe being adapted for sucking cutting chips and poisonous gas, wherein the movable cylinder has a joint portion, a forward end portion, and an intermediate portion, the joint portion being connected to the base cylinder, the forward end portion surrounding the drill of the drilling machine, the intermediate portion being disposed between the joint portion and the forward end portion, and wherein the forward end portion of the movable cylinder surrounds the tool with a predetermined gap, spiral grooves being defined on an inner wall of the forward end portion, the outlet opening portion being defined at the forward end portion, the inlet opening portion being defined at the intermediate portion of the movable cylinder, the blowing pipe being adapted for supplying dehumidified, cold, and compressed air.

4 Claims, 7 Drawing Sheets

PRIOR ART

FIG. 12

PRIOR ART

FIG. 13

PRIOR ART 300,000 # COOLING AND DUST COLLECTING APPARATUS FOR A MACHINE TOOL

BACKGROUND OF THE INVENTION

1. Field of the Invention

The present invention relates to a cooling and dust collecting apparatus for a drilling machine tool, in particular, to a cooling and dust collecting apparatus for use with a drilling machine which cools a cutter and sucks and exhausting cutting chips and poisonous gas.

2. Description of the Related Art

Generally, drilling machines such as hand-type air drills are used along with their cooling and dust collecting apparatuses. These cooling and dust collecting apparatuses cool a drill and exhaust cutting chips which take place in a drilling operation.

In recent years, compound materials such as carbon fiber reinforced plastics (CFRP) have been widely used in various fields including aircraft production. When a compound material is machined, however, it may emit poisonous gas due to frictional heat generated between the compound material and the drill. If the poisonous gas scattered to working environment, it would be very hazardous to the workers. Thus, the poisonous gas should be exhausted so that it does not scatter to the working environment.

A cooling and dust collecting apparatus for use with a drilling machine which cools a drill and exhausts poisonous gas as well as cutting chips is disclosed in Japanese Patent Laid Open Publication No. 63-16910.

Figure 11:
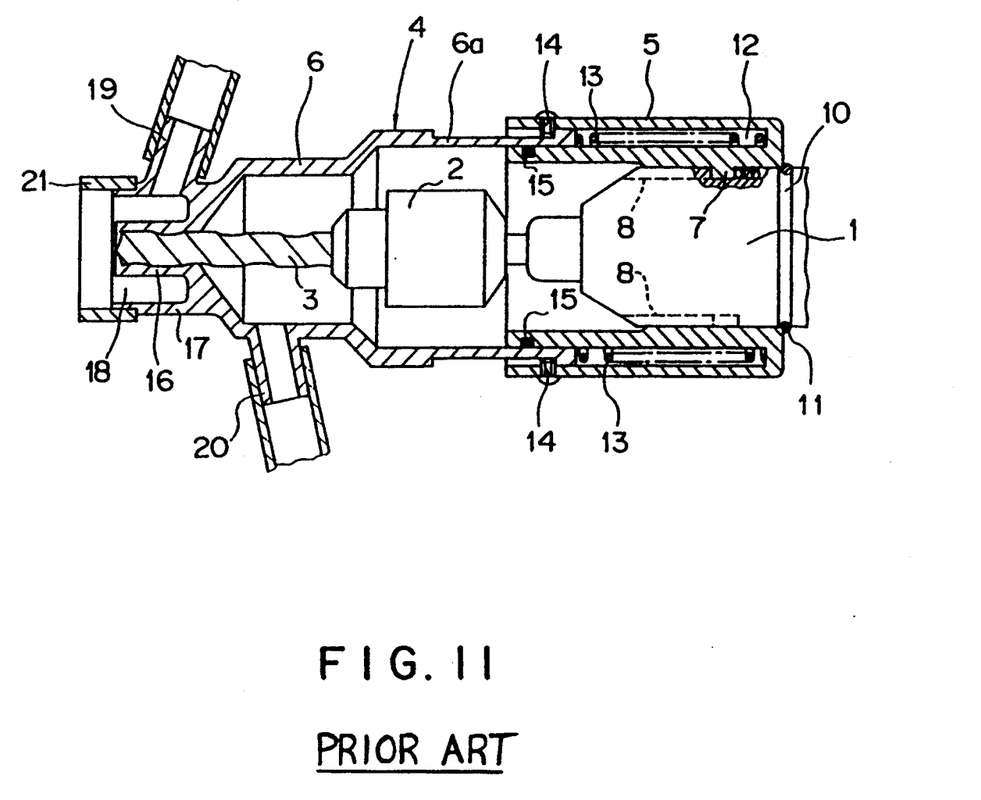
FIG. 11 is a sectional view showing the cooling and dust collecting apparatus of a prior art.

FIG. 11 shows the cooling and dust collecting apparatus for use with the drilling machine disclosed in the Japanese Patent Laid Open Publication No. 63-16910. A drill 3 is attached to a drilling machine 1 by a chuck 2. A telescopically expandable/shrinkable cylinder 4 is mounted around the drilling machine 1. The expandable/shrinkable cylinder 4 has a base cylinder 5 and a movable cylinder 6. The base cylinder 5 is detachably mounted on the drilling machine 1. The movable cylinder 6 is telescopically connected to the base cylinder 5.

Figure 12:
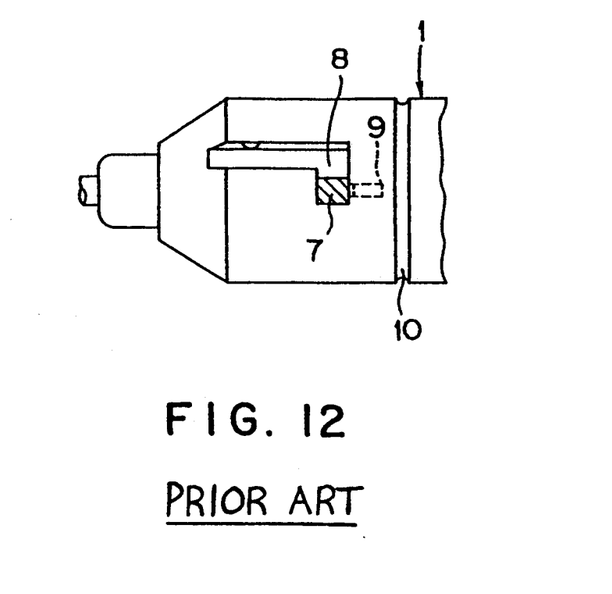
FIG. 12 is a partial front view of FIG. 11.

As shown in FIGS. 11 and 12, the base cylinder 5 has a plurality of inner protrusions 7. The protrusions 7 fit to end portions of L-letter shaped grooves 8 defined on the drilling machine 1 and secured by securing members 9. Thus, the base cylinder 5 is fixed to the drilling machine 1. The base cylinder 5 is airtightly closed by a ring-shaped rubber packing 11 which fits to a ring-shaped groove 10 of the drilling machine 1.

A base portion, which is a joint portion, of the movable cylinder 6 is disposed in an intermediate chamber 12 of the base cylinder 5. The joint portion is tensioned by a spring 13 disposed in the intermediate chamber 12 so that the joint portion is placed in a most extended position. A plurality of pins 14 are disposed in the base cylinder and protrude in the intermediate chamber 12. The pins 14 fit to grooves 6a defined on the outer periphery of the movable cylinder 6 so as to limit the movable range of the movable cylinder 6. An O ring 15 seals the base cylinder 5 and the movable cylinder 6.

Figure 13:
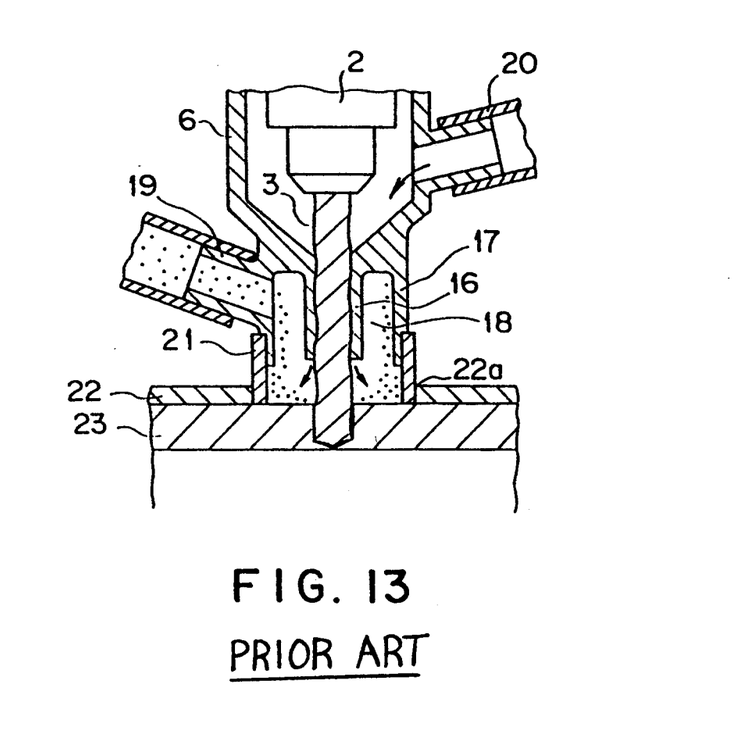
FIG. 13 is a sectional view showing the cooling and dust collecting apparatus of the prior art.

A forward end portion of the movable cylinder 6 branches out into a cylindrical guide 16 and an outer cylinder 17. A ring-shaped chamber 18 is defined between the cylindrical guide 16 and the outer cylinder 17. The outer diameter of the cylindrical guide 16 is slightly larger than that of the drill 3. An inlet opening 19 is defined on the outer cylinder 17. The inlet opening 19 is connected to the ring-shaped chamber 18. An outlet opening 20 is connected to an intermediate portion of the movable cylinder 6. A detachable transparent sleeve 21 is disposed at a forward end of the movable cylinder 6. As shown in FIG. 13, the transparent sleeve 21 fits to a guide hole 22a defined on a panel 22.

Next, the operation of the related art cooling and dust collecting apparatus for use with the drilling machine will be described.

As shown in FIG. 13, compressed air supplied from the outlet opening 20 flows between the drill 3 and the cylindrical guide 16, thereby cooling the drill 3. Thereafter, the compressed air exits to the ring-shaped chamber 18. The drill 3 cuts a workpiece 23 which is made of a composite material. The resultant cutting chips and poisonous gas are sucked and exhausted from the inlet opening 19.

The cutting chips and poisonous gas are trapped in the ring-shaped chamber 18 and sucked from the inlet opening 19. Thus, the cutting chips and poisonous gas are exhausted to the outside of the apparatus without leakage to the working environment.

However, in the related art cooling and dust collecting apparatus for use with the drilling machine, the distance between the cylindrical guide and the drill was small, compressed air was not sufficiently supplied. In addition, cutting chips and poisonous gas were sucked from the inlet opening partially connected to the ring-shaped chamber. In other words, since the cutting chips and poisonous gas were not sufficiently exhausted, they adversely resided in the apparatus.

SUMMARY OF THE INVENTION

An object of the present invention is to provide a cooling and dust collecting apparatus for use with a drilling machine which satisfactorily cools a drill and exhausts cutting chips and poisonous gas.

The present invention is a cooling and dust collecting apparatus for use with a drilling machine, comprising a telescopically expandable/shrinkable cylinder having a base cylinder and a movable cylinder, the base cylinder being disposed on the drilling machine in such a manner that the base cylinder surrounds the drilling machine, the movable cylinder being slidably connected to the base cylinder, the movable cylinder surrounding a drill, a blowing pipe connected to an outlet opening portion defined on the movable cylinder, the blowing pipe being adapted for blowing the drill with cold dry air, and a sucking pipe connected to an inlet opening portion defined on the movable cylinder, the sucking pipe being adapted for sucking the chips and poisonous gas, wherein the movable cylinder has a joint portion, a forward end portion, and an intermediate portion, the joint portion being connected to the base cylinder, the forward end portion surrounding the drill of the drilling machine, the intermediate portion being disposed between the joint portion and the forward end portion, and wherein the forward end portion of the movable cylinder surrounds the drill with a predetermined gap, spiral grooves being defined on an inner wall of the forward end portion, the outlet opening portion being defined at the forward end portion, the inlet opening portion being defined at the intermediate portion of the movable cylinder, the blowing pipe being adapted for supplying dehumidified, cold, compressed air.

The outlet opening portion of the movable cylinder is preferably provided with a first outlet opening and a second outlet opening, the first outlet opening being adapted for blowing the drill in a direction nearly perpendicular thereto with the compressed air, the second outlet opening being adapted for blowing the drill in drilling direction, in a reverse direction of the rotating direction thereof, and in a tangent direction of an outer periphery thereof with the compressed air.

The cooling and dust collecting apparatus for use with the drilling machine preferably further comprises a transparent sleeve protruding from the forward end portion of the movable cylinder, the transparent sleeve defining a plurality of outer air intake holes.

The compressed air is preferably air from which moisture, oil, and dust have been removed, and the temperature of the compressed air is in the range from 2° to −15° C.

As described above, according to the present invention, the forward end portion of the movable cylinder concentrically surrounds the drill with a predetermined gap. Spiral grooves are defined on the inner wall of the forward end portion of the movable cylinder. The outlet opening portion is defined at the forward end portion of the movable cylinder. The inlet opening portion is defined at the intermediate portion of the movable cylinder. Since the blowing pipe blows the drill with compressed dry cold air, the apparatus can satisfactorily cool the drill and exhaust cutting chips and poisonous gas without trapping in the forward end portion of the movable cylinder.

In addition, since the drill is satisfactorily cooled, the drill gets less worn out. Thus, durability of the drill can be remarkably improved. In addition, since the size of cutting chips generally becomes small, they can be easily exhausted.

A blowing pipe blows the drill with compressed air through the outlet opening portion. The compressed air cools the drill and causes cutting chips to float so as to separate them from the drill. Part of the compressed air collides with the spiral grooves on the inner wall of the forward end portion of the movable cylinder. Thus, the compressed air upwardly flows along the spiral grooves, thereby removing the cutting chips from the inner wall of the forward end portion of the movable cylinder. Consequently, the cutting chips upwardly move as the air spirally flows.

The sucking pipe sucks air along with the cutting chips and poisonous gas, thereby exhausting them to the outside of the apparatus.

Thus, the apparatus can satisfactorily cools the drill and exhausts cutting chips and poisonous gas rather than keeping them resided in the forward end portion of the movable cylinder.

These and other objects, features and advantages of the present invention will become understood in light of the following detailed description of a best mode embodiment thereof, as illustrated in the accompanying drawings.

DESCRIPTION OF PREFERRED EMBODIMENT

With reference to FIGS. 1 to 10, an embodiment of a cooling and dust collecting apparatus for use with a drilling machine according to the present invention will be described. For the sake of simplicity, in this embodiment, similar portions to FIGS. 11 to 13 are denoted by similar reference numerals.

Figure 1:
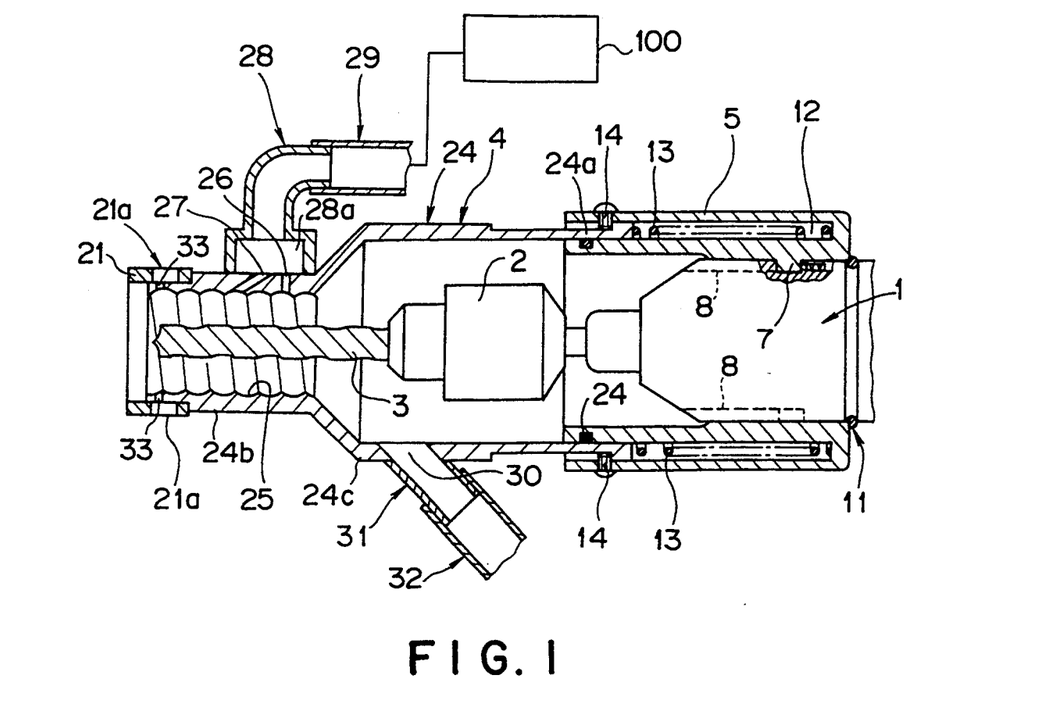
FIG. 1 is a sectional view showing an embodiment of a cooling and dust collecting apparatus for use with a drilling machine according to the present invention.
Figure 2:
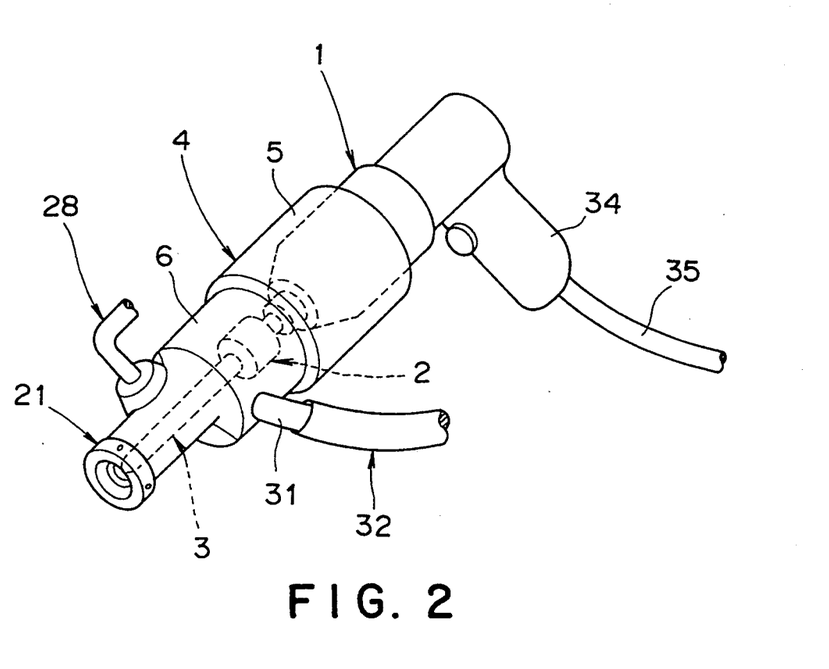
FIG. 2 is a perspective view showing a schematic structure of the embodiment.

In FIGS. 1 and 2, a telescopically expandable/shrinkable cylinder 4 is constructed of a base cylinder 5 and a movable cylinder 24. The movable cylinder 24 is constructed of a joint portion 24a, a forward end portion 24b, and an intermediate portion 24c. The joint portion 24a is connected to the base cylinder 4. The forward end portion 24b concentrically surrounds a drill 3 of a drilling machine. The intermediate portion 24c is disposed between the joint portion 24a and the forward end portion 24b. The forward end portion 24b of the movable cylinder 24 concentrically surrounds the drill 3 of the drilling machine with a predetermined gap. Spiral grooves 25 are defined on the inner wall of the forward end portion 24b. The direction of the spiral grooves 25 is the same as the rotating direction of the drill 3.

Figure 3:
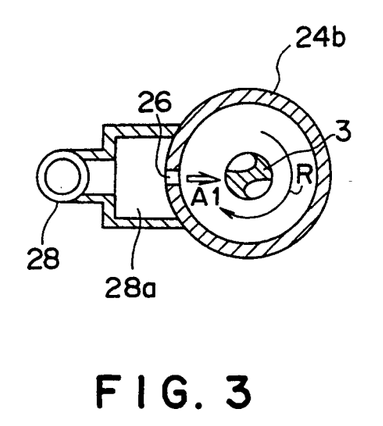
FIG. 3 is a sectional view showing an outlet opening of the embodiment.
Figure 4:
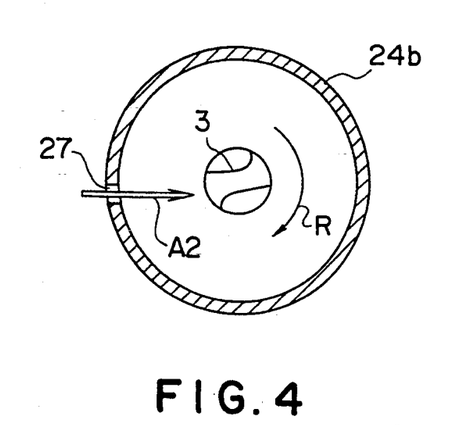
FIG. 4 is a sectional view showing another outlet opening of the embodiment.

Outlet openings 26 and 27 are defined at the forward end portion 24b of the movable cylinder 24. As shown in FIG. 3, the outlet opening 26 is a through-hole defined perpendicular to the inner wall of the forward end portion 24b. In this embodiment, the diameter of the outlet opening 26 is in the range from 1.5 to 2.0 mm. The outlet opening 26 blows the center of the drill 3 with cold air as denoted by an arrow A1. The outlet opening 27 is disposed closer to the forward end of the forward end portion 24b than the outlet opening 26. The outlet opening 27 is a through-hole defined on the inner wall with a predetermined angle thereto. In this embodiment, the diameter of the outlet opening 27 is in the range from 2.5 to 3.0 mm. As shown in FIG. 4, the outlet opening 27 is opposed to the middle position of the center of the drill 3 and the outer periphery thereof. As denoted by an arrow A2, the outlet opening 27 blows a drilling portion of a workpiece 23 in the reverse direction of the rotating direction R of the drill 3 and nearly in the tangent direction of the outer periphery of the drill 3 with cold air.

A blowing pipe 28 is connected to the forward end portion 24b of the movable cylinder. The blowing pipe 28 is connected to the outlet openings 26 and 27. The blowing pipe 28 has a storage chamber 28a which temporarily stores cold air and equalizes the pressure thereof. The storage chamber 28a is connected to a cold air supply unit 100 through a rubber hose 29. The supply unit 100 removes moisture, oil, and dust from air, cools the air to a temperature in the range from 2° to −15° C., and supplies the cold air to the blowing pipe 28.

An inlet opening 30 is defined at the intermediate portion 24c of the movable cylinder 24. A sucking pipe 31 is connected to the inlet opening 30. The sucking pipe 31 is connected to the intermediate portion 24c of the movable cylinder with a predetermined angle thereto. The sucking pipe 31 is connected to a vacuum tank (not shown) through a rubber hose 32. The vacuum tank is kept in constant vacuum state by a vacuum pump, a blower, or the like. Thus, most of cutting chips which are sucked into the vacuum tank. The vacuum tank is provided with a processing unit which processes the rest of fine powder cutting chips and poisonous gas.

Figure 5:
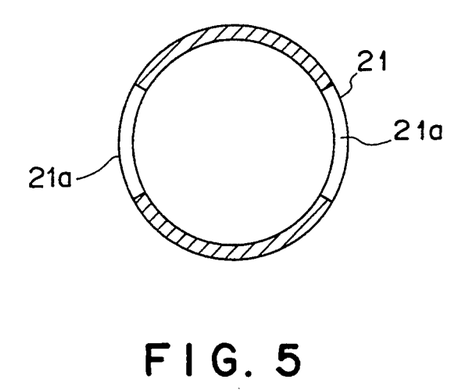
FIG. 5 is a sectional view showing a transparent sleeve of the embodiment.
Figure 6:
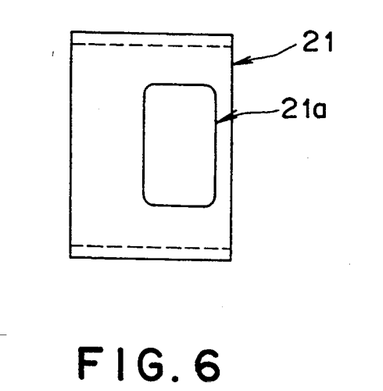
FIG. 6 is a front view showing the transparent sleeve of the embodiment.

The forward end portion 24b of the movable cylinder is provided with a detachable transparent sleeve 21. As shown in FIGS. 5 and 6, the transparent sleeve 21 defines a plurality of outer air intake holes 21 at intervals of predetermined equi-angles. Opposed holes 33 corresponding to the outer air intake holes 21a are defined at the forward end portion 24b of the movable cylinder 24.

Figure 8:
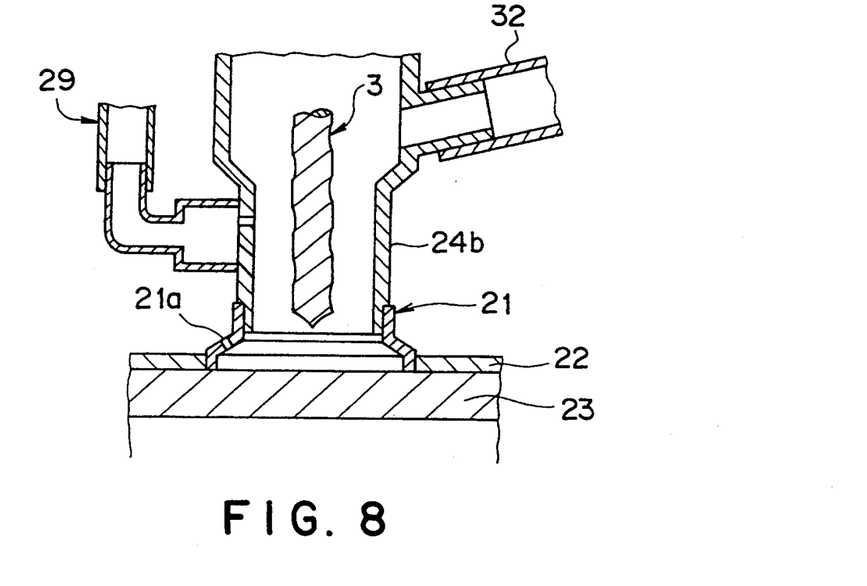
FIG. 8 is a sectional view showing a modification of the transparent sleeve.

As shown in FIG. 8, the transparent sleeve 21 may have a wide forward end portion.

In FIG. 2, the drilling machine 1 has a handle 34 which is connected to a rubber hose 35 through which compressed air is supplied.

Figure 9:
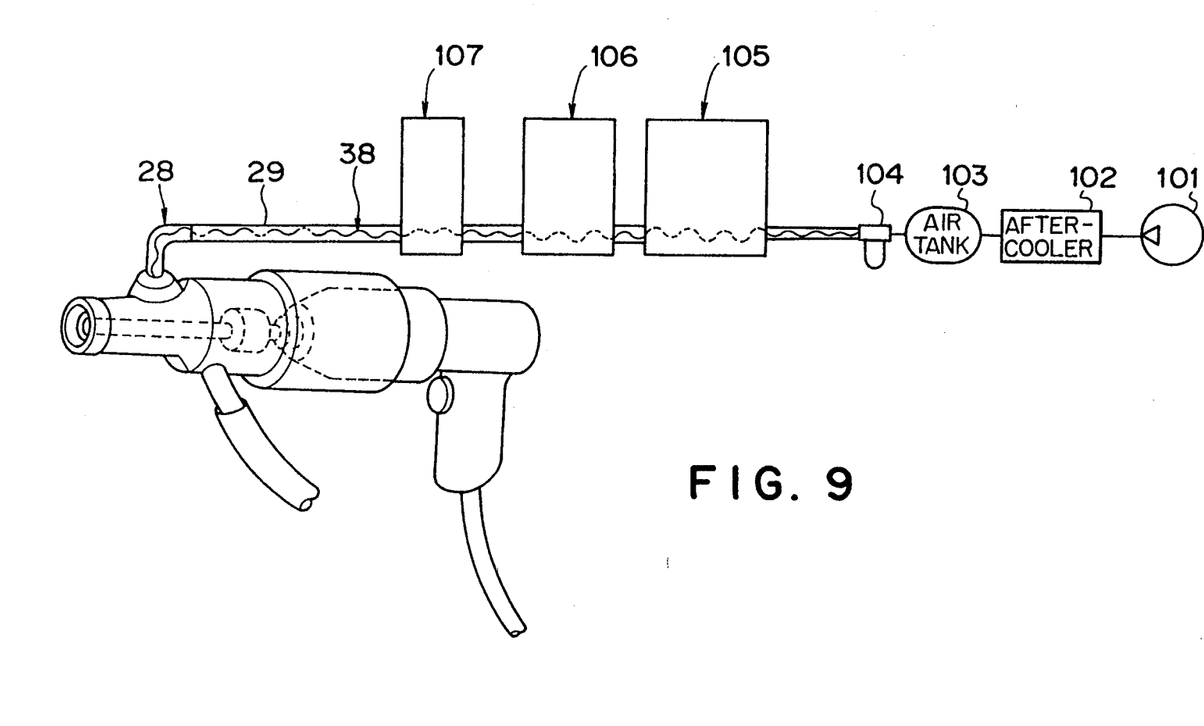
FIG. 9 is a block diagram showing the whole structure of a compressed cold air supply portion.

FIG. 9 is a block and schematic diagram showing the construction of a cold air generation and supply unit 100 which is a constructional block shown in FIG. 1. Dust-free utility air with a pressure of 5 to 6 kg/cm³ is produced by a compressor 101, an after-cooler 102, an air tank 103, and a main filter 104. An air dryer 105 removes moisture from the utility air and cools it to 10° C. A regulator/drain 106 removes oil from the utility air. A cooler 107 cools the utility air to a temperature ranging from 2° to −15° C. The resultant pressurized cold air at a temperature ranging from 2° to −15° C. is supplied to the blowing pipe 28 through the rubber hose 29.

The other portions of FIG. 9 are the same as those of FIG. 11.

Next, the operation of the embodiment will be described.

Figure 7:
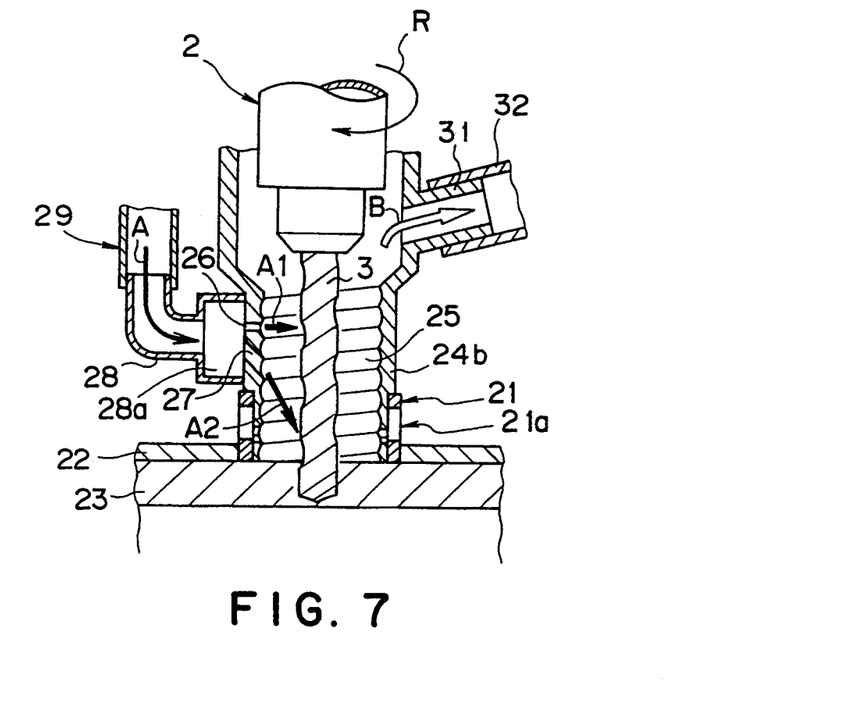
FIG. 7 is a sectional view showing the embodiment which is drilling a workpiece.

As shown in FIG. 7, the blowing pipe 28 supplies cold dry air A at a temperature of 2° to −15° C. through the blowing openings 26 and 27. The blowing pressure is kept almost constant by the storage chamber 28a. As shown in FIG. 3, cold air A1 supplied from the blowing opening 26 vertically collides with and cools the drill 3. Cold air A2 supplied from the blowing opening 27 collides with and cools a forward end portion and cutting portion of the drill 3. The collision and cooling by the cold air suppress occurrence of burring at the drilling portion and remove burs when present.

As shown in FIG. 4, the cold air A2 supplied from the outlet opening 27 collides with the drill 3 in the reverse direction of the rotating direction R thereof and in the almost tangent direction of the outer periphery thereof, thereby removing cutting chips which adhere around the drill 3.

After the cold airs A1 and A2 collide with the drill 3 and the workpiece 23, they are sucked by the sucking pipe 31. Thus, the cold airs A1 and A2 upwardly flow along with cutting chips and poisonous gas. As a result, as denoted by an arrow B, the cold air A1, A2, the cutting chips, and the poisonous gas are exhausted from the sucking pipe 31 through the rubber hose 32.

The cold air which collides with the spiral grooves 25 spirally and upwardly flows, thereby causing the neighboring cold air to upwardly flow and cutting chips which adhere to the inner wall of the forward end portion 24b to remove. Thus, the spiral grooves 25 cause adhesion of cutting chips to the inner wall of the forward end portion 24b of the movable cylinder to decrease.

The outer air intake hole 21a of the transparent sleeve 21 serves to suck outer air so as to further blow the cutting chips and to exhaust thereof from the sucking pipe 31.

Thus, according to the embodiment, the cooling of the drill 3 by the cold air A1 supplied from the outlet opening 26 and the cooling of the drill 3 and the drilling hole by the cold air A2 supplied from the blowing opening 27 can sufficiently suppress occurrence of burring. In addition, since the cold dry air makes the size of cutting chips and burrs small, they can be easily removed and exhausted. Moreover, the spiral grooves 25 furthers upward flowing of the cold air. Thus, the cutting chips which adhere to the inner wall of the forward end portion 24b are removed and exhausted.

Next, the cooling effect by dehumidified cold air A at a temperature ranging from 2° to −15° C. which was used in the embodiment will be described according to an experimental result.

In the experiment, the amount of cold air was supplied at a rate of 66.4 litters/minute. The pressure of cold air was 6 kg/cm³.

Figure 10:
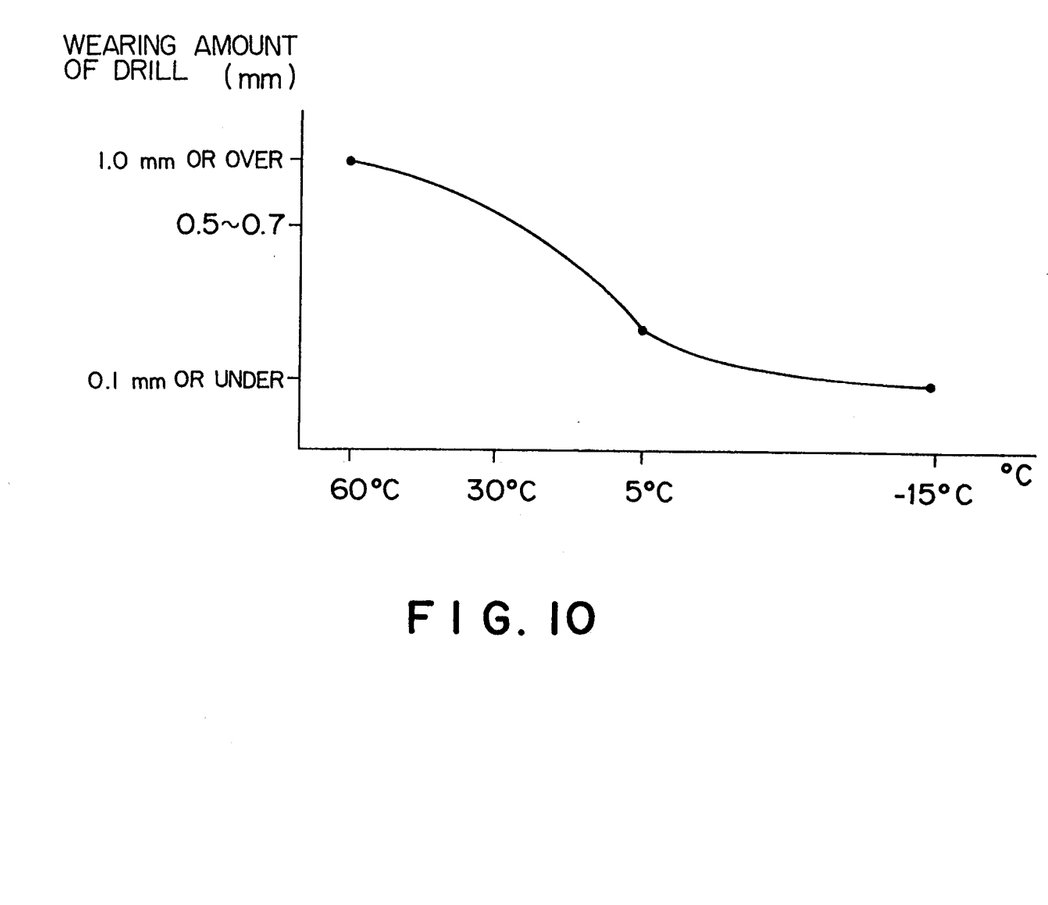
FIG. 10 is a graph showing an experimental result with respect to the embodiment.

FIG. 10 is a graph giving the relation between temperatures of the cold air and the wearing amounts of the drill. As is clear from the graph, when the temperature of the cold air became approximately 2° C. or below, the wearing amounts of the drill remarkably decreased.

When the temperature of the air with normal humidity was 10° C. or higher, the drills got worn for 1.0 mm or more in around 20 minutes. When the cold air with the temperature ranging from 2° to −15° C. was used, the drills got worn in 10 hours.

When normal air was used, the size of the burr was 3 to 5 mm. However, when the cold air with the temperature ranging from 2° to −15° C. the size of the burr was 0.3 mm or less.

Although the present invention has been shown and described with respect to a best mode embodiment thereof, it should be understood by those skilled in the art that the foregoing and various other changes, omissions, and additions in the form and detail thereof may be made therein without departing from the scope of the present invention.

What is claimed is:

1. A cooling and dust collecting apparatus for a drilling machine tool having a spindle with a cutting tool, comprising:
   a base cylinder connected to said spindle;
   a movable cylinder inserted in said base cylinder for covering said tool and for moving telescopically in said base cylinder;
   said base cylinder being disposed on said drilling machine tool in such a manner that said base cylinder surrounds said spindle;
   said movable cylinder being slidably connected to said base cylinder and provided with an outlet opening portion and an inlet opening portion;

a blowing pipe connected to said outlet opening portion of said movable cylinder and adapted for blowing said tool with cold air;

a sucking pipe connected to said inlet opening portion and adapted for sucking cutting chips and poisonous gas;

wherein said movable cylinder has a joint portion, a forward end portion, and an intermediate portion, said joint portion being connected to said base cylinder, said forward end portion surrounding said tool, said intermediate portion being disposed between said joint portion and said forward end portion; and wherein said forward end portion of said movable cylinder surrounds said tool with a predetermined gap, spiral grooves being defined on an inner wall of said forward end portion, said outlet opening portion being defined at said forward end portion, said inlet opening portion being defined at said intermediate portion of said movable cylinder, said outlet pipe being adapted for supplying dehumidified, cold, compressed air.

2. The cooling and dust collecting apparatus according to the claim 1 wherein:

said blowing opening portion of said movable cylinder has a first blowing opening and a second blowing opening, said first blowing opening being adapted for blowing said tool in a direction nearly perpendicular thereto with said compressed air; and said second blowing opening being adapted for blowing said tool in a direction of said tool against a workpiece, in a reverse direction of the rotating direction thereof, and in a tangent direction of an outer periphery thereof with said compressed air.

3. The cooling and dust collecting apparatus as set forth in claim 1, further comprising:

a transparent sleeve protruding from said forward end portion of said movable cylinder, said transparent sleeve defining a plurality of outer air intake holes.

4. The cooling and dust collecting apparatus as set forth in claim 1, wherein said compressed air is air from which moisture, oil, and dust have been removed, the temperature of said compressed air being in the range from 2° to −15° C.

* * * * *